Patented Dec. 26, 1933

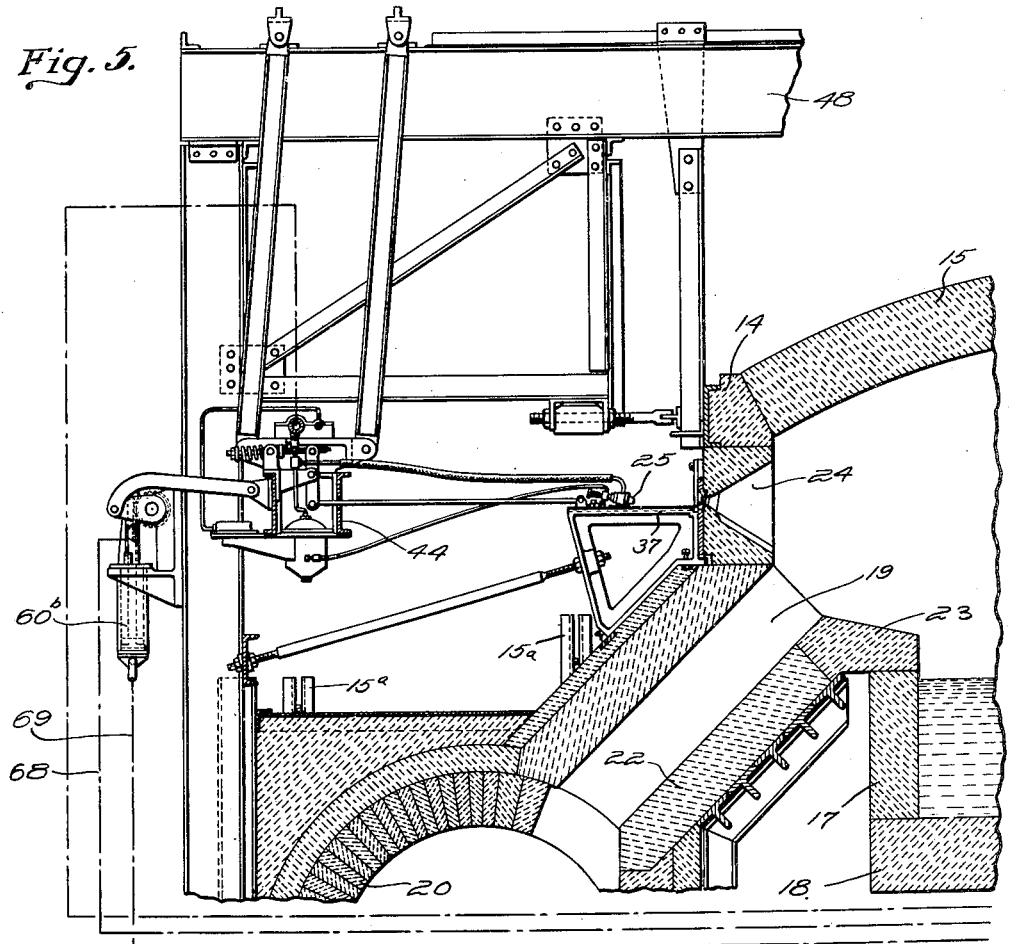
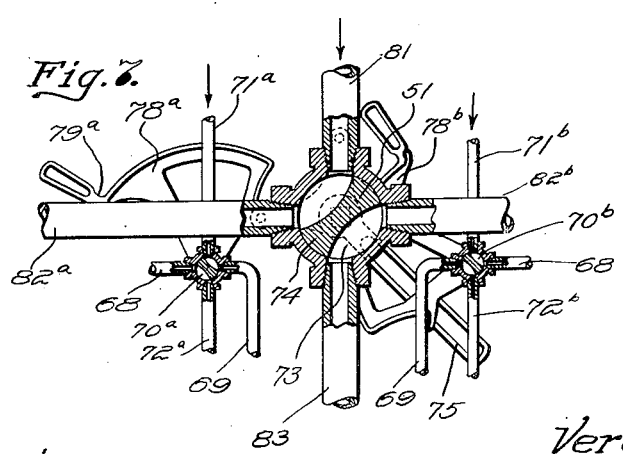

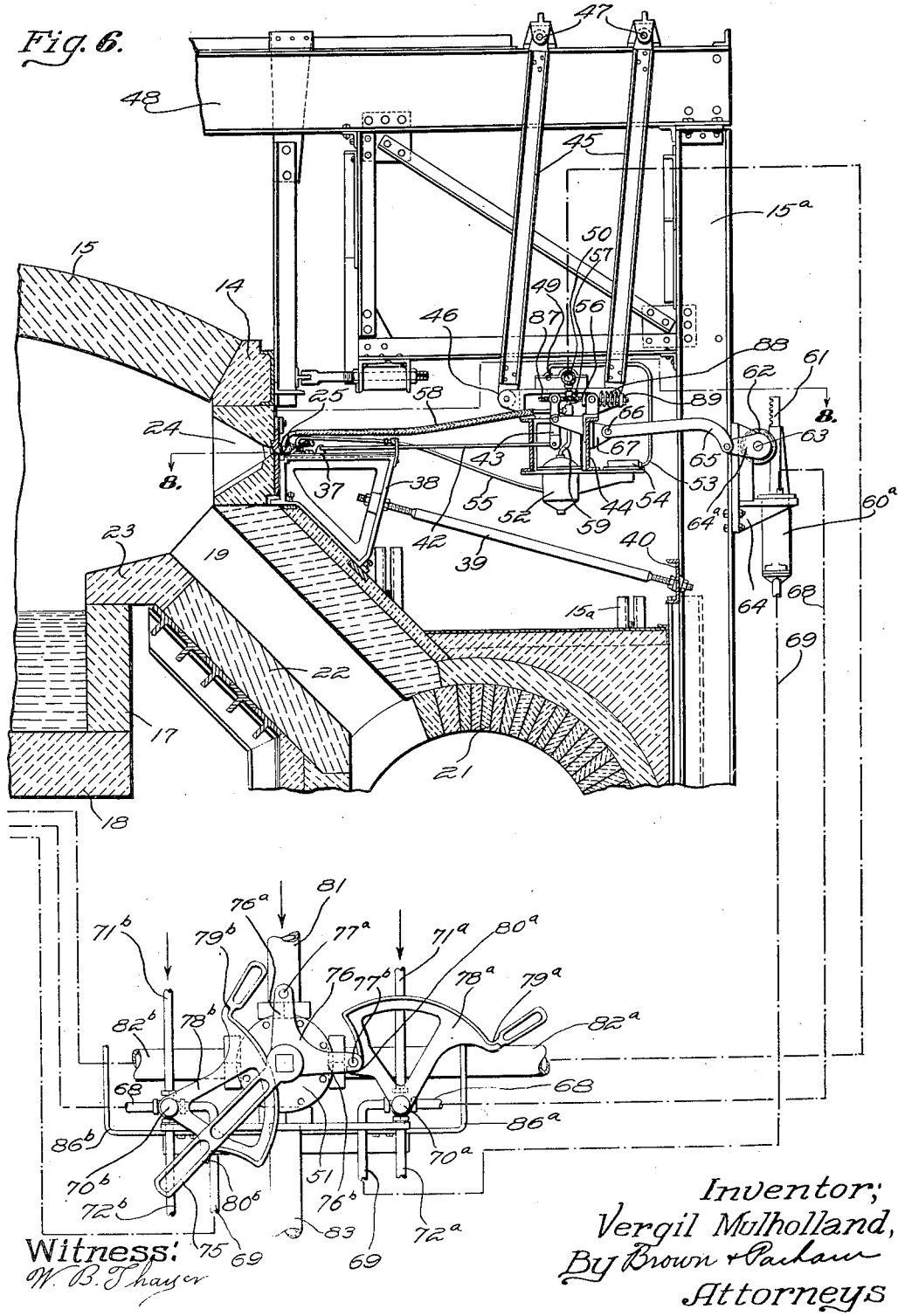

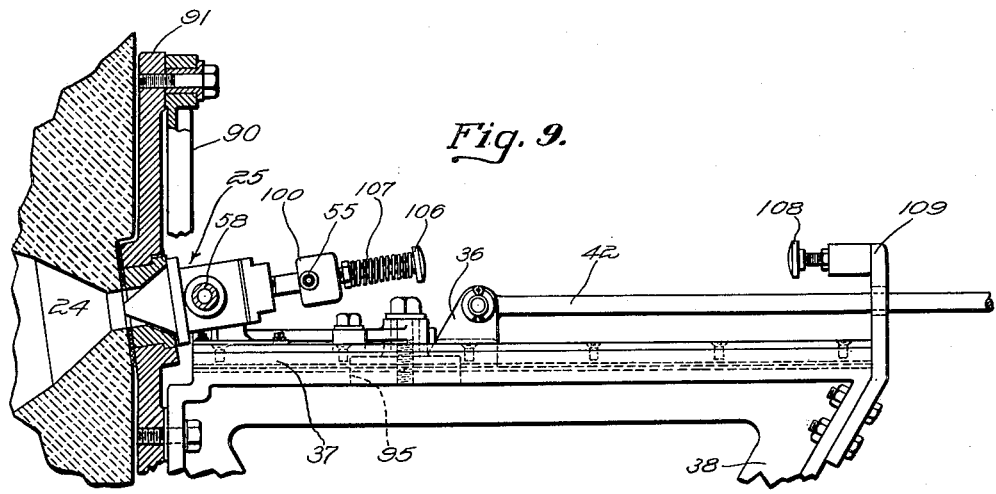
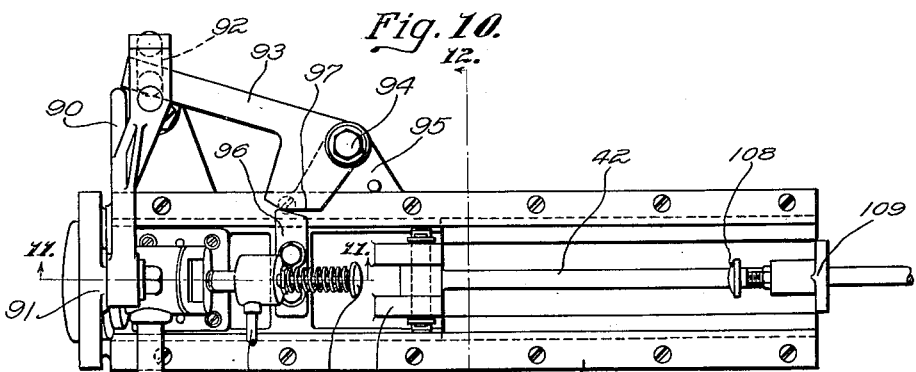
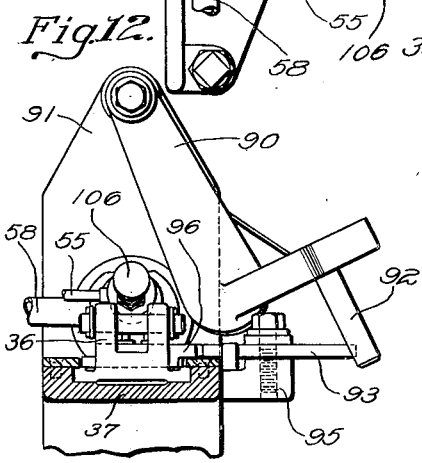
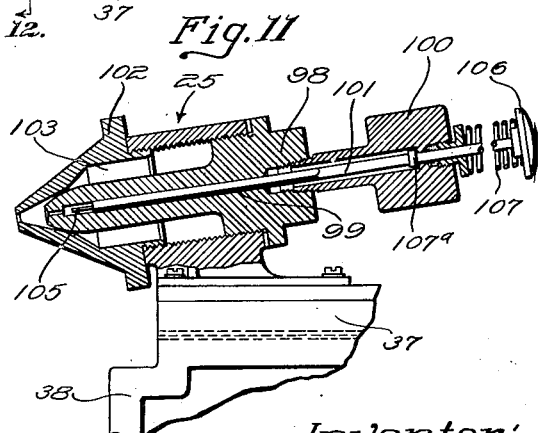

1,941,411

UNITED STATES PATENT OFFICE 1,941,411

REGENERATIVE GLASS MELTING FURNACE AND BURNER CONTROL MECHANISM THEREFOR

Vergil Mulholland, West Hartford, Conn., assignor to Hartford-Empire Company, Hartford, Conn., a corporation of Delaware Application October 3, 1930. Serial No. 486,064

8 Claims. (Cl. 158—2)

This invention relates to glass melting furnaces of the regenerative type and more particularly to the burners, burner mountings and arrangement, and to control mechanism for moving the burners and regulating the supply of fuel thereto on reversals of the furnace. The invention is particularly adapted for use with furnaces of the types shown in my copending United States application Serial No. 405,975, filed November 9, 1929, wherein is shown a tank of novel construction provided with regenerators extending substantially continuously throughout the length of the zone to be fired and with burner ports located above the regenerator flues and spaced at close intervals longitudinally of the melting zone. Such tank is shown particularly in the accompanying drawings, and will be hereinafter described in somewhat more detail, the peculiar advantages thereof having been set forth at length in my aforesaid copending application.

Among the principal features of the present invention are the provision of (1) suitable mountings or carriages upon which all or any number of the burners on either side of the tank may be carried for simultaneous or "bank" movement into and out of firing position adjacent the burner together with power means for moving the carriages with their burners toward and from firing position; (2) a unitary control for the fuel supply of all of the burners of a bank; (3) suitable interlocked control mechanism governing the operation of the power means for moving the the burners into and out of firing position, and also the supply of fuel to the burners to the end that when burners are withdrawn from firing position, the fuel supply must be off and may be turned on again only when the burners are again in proper firing position with respect to the furnace, and then only when the supply to the opposite burners has been cut off.

In combination with these features, my invention includes the provision of suitable individual control of fuel to each burner of the bank, whereby the heat gradient longitudinally of the furnace may be regulated. I have also provided, in combination with the foregoing features, the feature heretofore described in said copending application of zone control of the regenerators which together with the individual control of the burners, permits accurate regulation of the heat gradient in the tank.

A further feature of the present invention is the provision of suitable closures for the burner ports adapted to automatically move to closing position when the burners are moved away from the ports, and to be automatically moved out of closing position as the burners are moved into firing position. These and other features will appear from the following specification and claims, when considered in connection with the accompanying drawings, in which Figure 1 is a horizontal sectional view of a tank of the type heretofore referred to, and to which my present invention is particularly adapted, the view being taken on the line 1—1 of Fig. 2;

Figure 4:
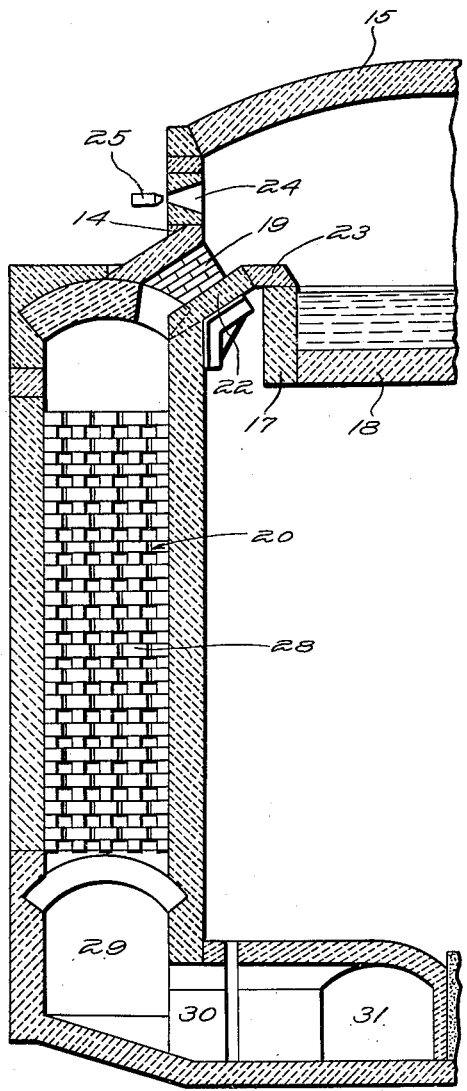
Fig. 4 is a fragmentary view similar to that of Fig. 2, but showing a modified arrangement of the regenerators and furnace.
Figure 8:
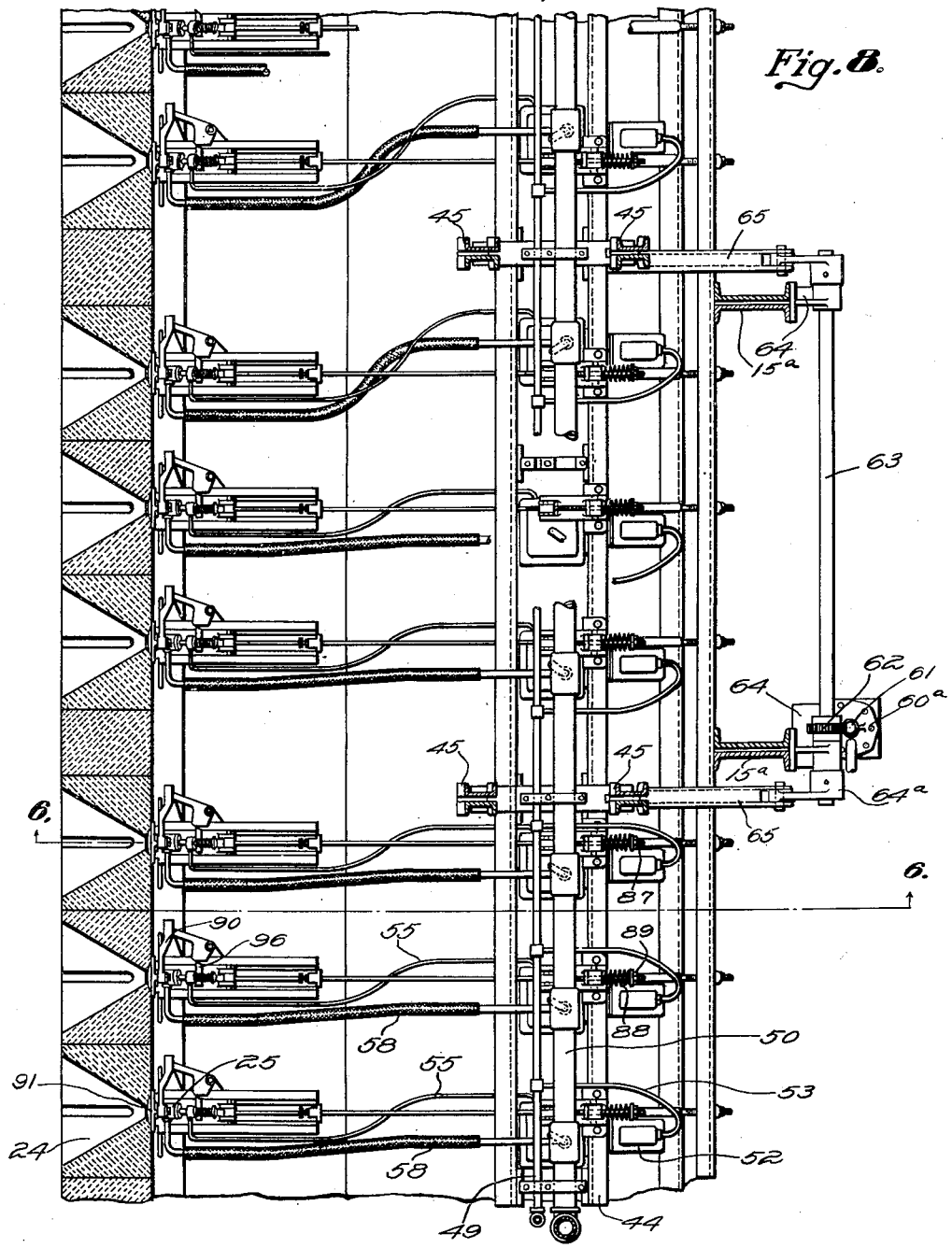

Figs. 5 and 6 are fragmentary sectional views of a furnace of the type of that of Fig. 4, and show the apparatus of the present invention in elevation, the burners in Fig. 5 being shown in the withdrawn position, while those of Fig. 6 are shown in their firing or active position. Fig. 6 also shows in elevation the interlocking control mechanism for governing the movements of the burners into and out of firing position, and the control of fuel thereto. Figs. 5 and 6 together illustrate a normal condition during operation of the burners and the control mechanism;

Fig. 7 is a sectional view through the controlling valve illustrated in Fig. 6, the view being taken 180° from that shown in Fig. 6;

Fig. 8 is a plan view of one of the banks of burners, the burners being shown in firing position; and Figs. 9 to 12 inclusive show details of the burners and closures.

The tank to which I preferably apply the burner and control mechanism of this invention is best illustrated in Figs. 1 to 4 inclusive, which figures are identical with Figs. 1 to 3 and 5 respectively of the said copending application. Referring to these figures, the melting furnace comprises a melting chamber 10 and a refining or conditioning chamber 11, which chambers are separated by a bridge wall 12 and communicate below the surface of the glass by a throat 13. The melting compartment 10 has side walls 14 and a crown 15, the structure being maintained and supported by the usual buckstays 15a. A glass containing basin 16 having side walls 17 and bottom 18 of flux blocks of the usual character is contained within the walls 14 and the crown 15, the side walls 17 being spaced from the walls 14 to provide for the entry between these walls of the regenerator flues 19.

Figure 2:
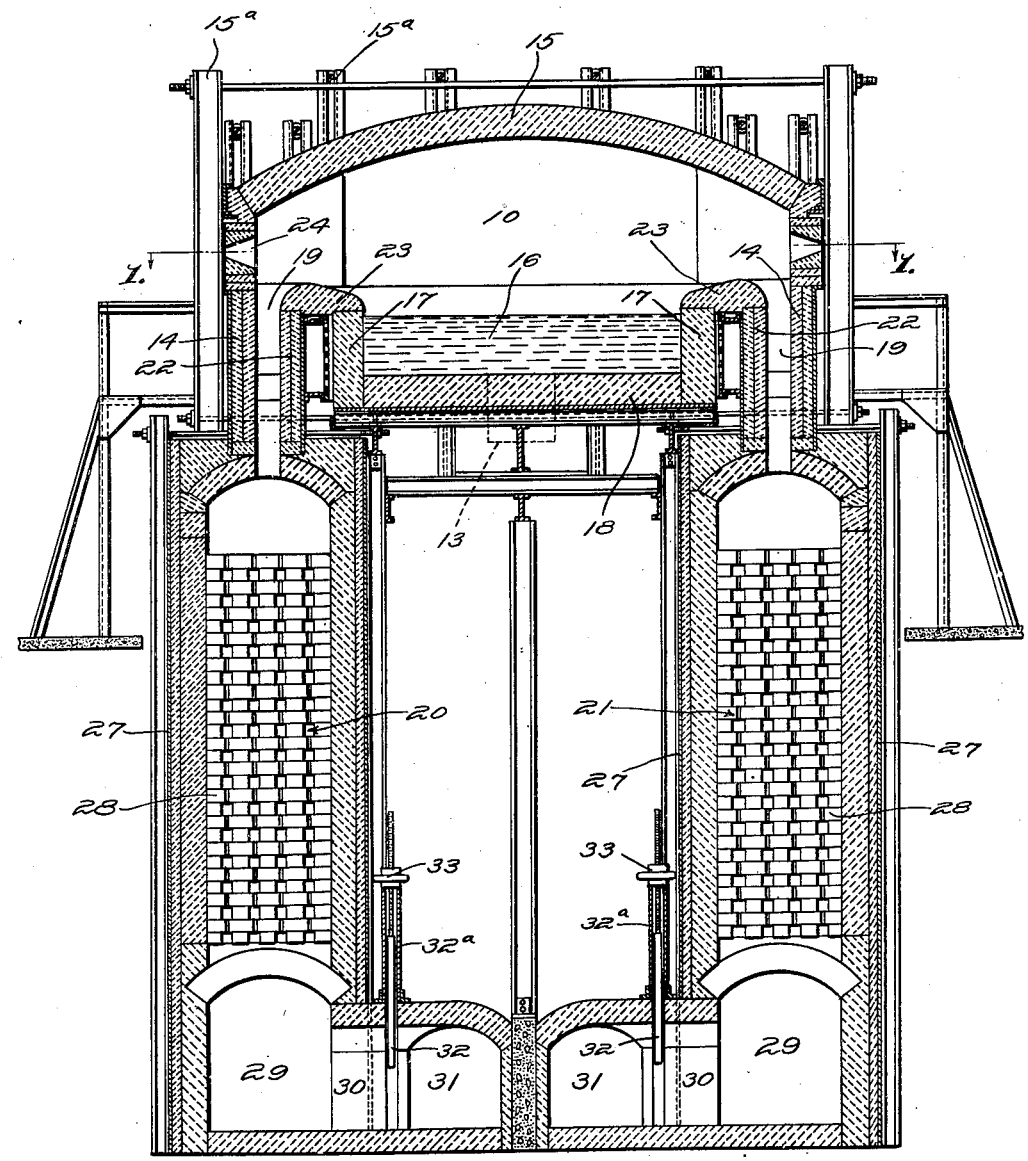
Fig. 2 is a vertical cross section taken on the line 2—2 of Fig. 1.
Figure 3:
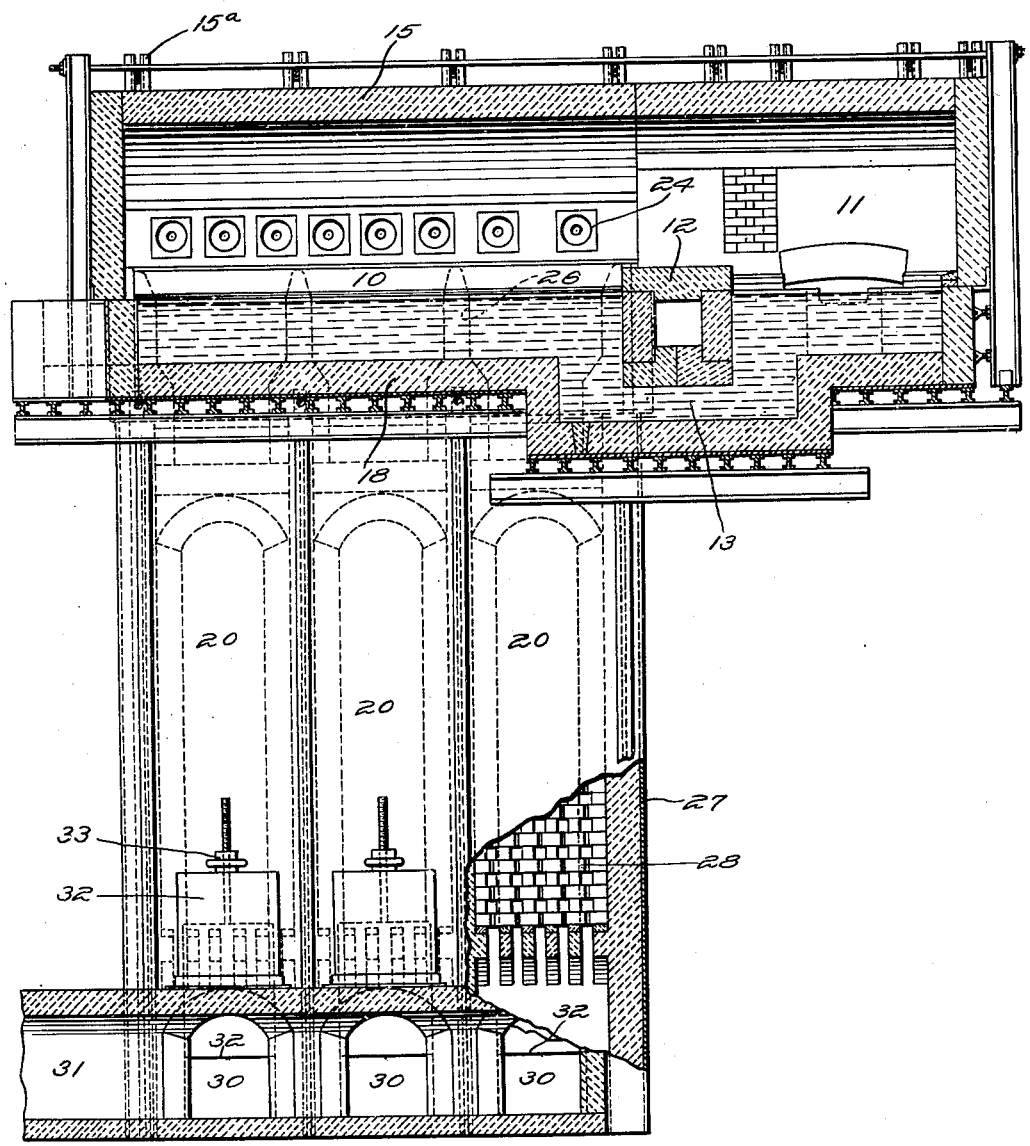
Fig. 3 is a longitudinal vertical section of the furnace of Figs. 1 and 2 taken on the line 3—3 of Fig. 1 and having parts broken away and in section.

A pair of divided regenerators 20 and 21 are provided below walls 14 and beyond the outer edges of the melting chamber, and communicate with the melting chamber by the flues 19, which may be either vertical as shown in Fig. 2, or may be upwardly sloping as shown in Fig. 4. The inner walls 22 of the flue 19 are spaced from the walls 17 of the glass containing basin. These walls carry a suitable refractory cover 23 preferably shaped as shown in Figs. 2 or 4. Above the upper end of the flues 19, the side walls 14 of the melting chamber are provided with a series of burner openings 24 which are spaced longitudinally of the melting chamber substantially throughout the length thereof. These openings are preferably close together and are provided with a plurality of burners 25 adapted to project fuel into the furnace. The mounting and control of these burners will be hereinafter described in detail.

Figure 1:
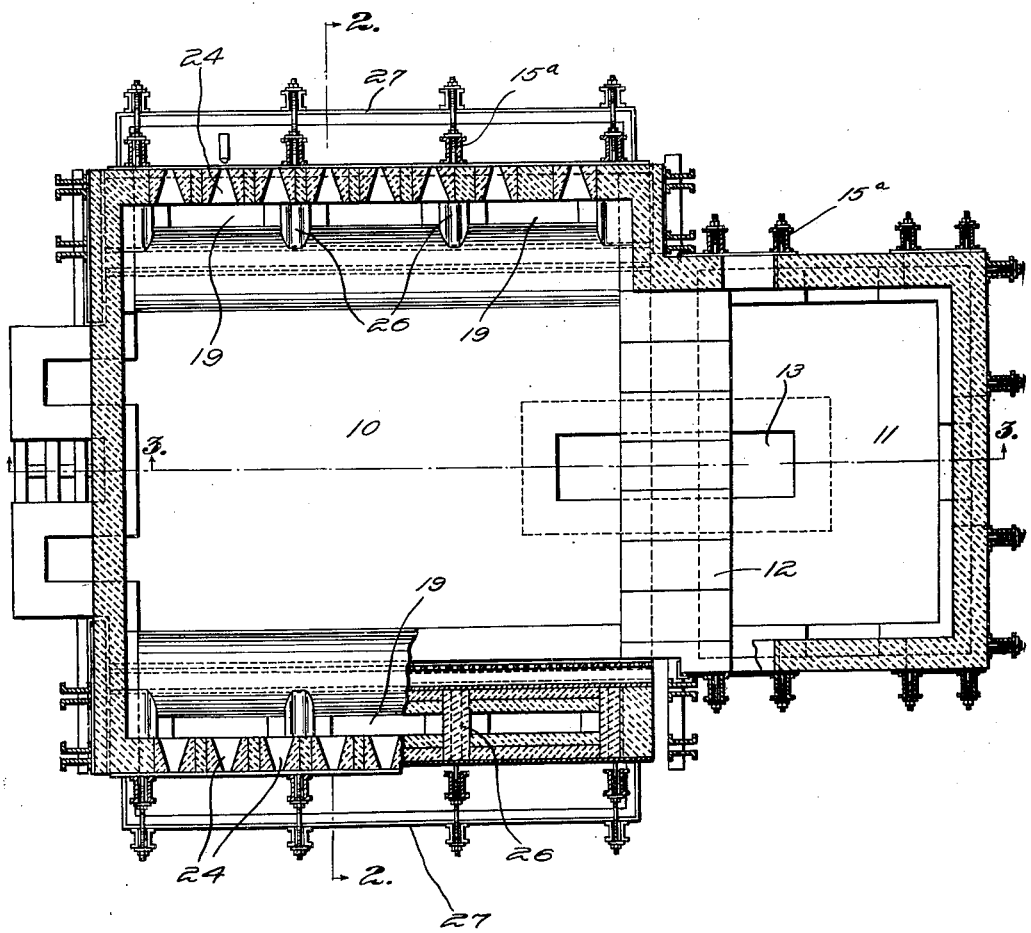

The regenerator flue 19, as best seen in Fig. 1, in effect constitutes substantially continuous flues extending the entire length of the melting chamber, the continuity of the flues being only interrupted by the partitions which divide the regenerators into sections, as hereinafter described. By this arrangement of an adequate number of closely spaced burners and of flues which extend substantially the entire length of the melting chamber, the furnace may be readily fired by a substantially neutral flame which will cover the entire surface of the glass and the intensity of this flame may be accurately regulated to give any suitable longitudinal heat gradient and energy curve. As the burners and the flues 19 are both spaced laterally beyond the glass containing wall 17, and as the fuel and air meet well beyond the edges of the glass containing basin, the combustion may be sufficiently complete at points adjacent the edges of the basin to fully heat the edge portions of the glass and prevent cool zones in such portions.

The regenerators 20 and 21 extend substantially the entire length of the melting chamber 10, and one of them is provided on either side of the chamber. Each of these regenerators is divided by vertical partitions 26, and thus in effect constitute a plurality of separately controllable regenerators formed as a single unit. This unit is preferably enclosed in a steel jacket 27 which prevents "breathing", thus increasing the efficiency of the regenerators and assuring uniformity of action of cooperating sections of the two regenerators. Each of the regenerator sections is provided with the usual checkers 28, a flue 19 communicating with the melting chamber and an intake and exhaust flue 29. The intake and exhaust flue 29 of each section of such regenerators communicates through a passage 30 with a common flue 31, through which the gases are exhausted and fresh air alternately taken in to each regenerator. Each passage 30 is controlled by a gate damper 32 mounted in a suitable bracket 32a, and provided with a nut and screw positioning means 33 by which the extent of opening of each passage 30 may be regulated as desired. By this arrangement, any section of each of the regenerators 20 and 21 may be optionally thrown into and out of operation either wholly or partially, and by this means, a further efficient regulation or zone control of the heat condition longitudinally of the melting chamber may be obtained. The flues 31 are provided with suitable gates or dampers (not shown) whereby they may be selectively connected with the stack or with an air inlet.

Referring now to Figs. 5 to 11 inclusive, I have shown (Fig. 8) a plurality of burners 25, each mounted on a suitable slide 36 mounted in a slideway 37 in a bracket 38 which is firmly held in position below the burner port 24 as by a rod 39, a channel 40 and buckstays 15a. The rear portion of the slide 36 is connected by link 42 and a lever 43 with a carriage 44. The carriage 44 comprises a frame extending longitudinally of the tank and is supported at suitable intervals by parallel bars 45 which are pivotally connected at one end to the carriage, as at 46, and at the other end with fixed pivots 47 carried by an overhead frame 48 supported by the buckstays 15a. The carriage 44 carries a single oil supply pipe 49 for supplying oil to all of the control mechanisms for the separate burners of the bank. This line is connected by suitable flexible connector with a fixed oil line which communicates with a suitably controlled supply of fuel oil (not shown). The carriage also carries a single air supply pipe 50 connected by a flexible connector and through the control valve 51 with a constant source of air supply under suitable pressure. Each individual burner control mechanism carried upon the frame 44, comprises an oil float tank 52 connected by a pipe 53 through suitable float controlled valve 54 with the oil supply pipe 49. Each of these float tanks is located below the level of its burner 25, and is connected thereto by a pipe 55. For each burner unit there is connected to the air supply line 50, a pipe 56 having a hand-controlled regulating valve 57 therein. Below this valve, the air line for each burner unit branches, one branch 58 carrying atomizing air directly to the burner and the other branch 59 supplying pressure to the top of the oil float tank 52. By this arrangement, the supply of air and fuel to each burner is dependent upon the pressure existing in the pipe line 56 below the valve 57, as such pressure is necessary, in addition to the head of oil standing in the float tank, to force oil to the burner.

By regulating the individual valves 57, the supply of air and oil to the burner may be regulated for each burner independently of the regulation of the other burners. As the main supply of air to all of the burners of a bank is controlled by the valve 51, it is obvious that by operation of that valve, the supply of fuel to all the burners of a bank may be simultaneously controlled.

The carriages 44 on either side of the furnace, with their several burners 25, may be moved toward and from the firing position by air motors 60a and 60b, respectively. Each motor comprises a cylinder having a piston, the rod of which carries a rack 61 which cooperates with pinion 62 mounted in bearings on a shaft 63 carried by brackets 64 secured to the buckstays. The shaft 63 carries cranks 64a to which are pivoted bent levers 65 pivoted as at 66 to ears 67 secured to the carriage 44. Air lines 68 and 69 are respectively provided to admit and exhaust air from the ends of each cylinder, these lines communicating through a valve 70a or 70b alternately with a pipe 71a or 71b leading from a source of pressure air (not shown), and with an exhaust pipe 72a or 72b.

In order to assure a proper seating of each of the burners 25 on its seat at port 24 and to remove the possibility of damage to the parts, the means connecting each individual burner with its carriage 44 includes the lever 43, and the adjustable screw rod 87 which extends through a sliding bearing and carries a compression spring 88 held in place by a nut 89, so that an adjustable yielding drive connection is provided.

The two valves 70a and 70b are mounted adjacent to and on either side of the valve 51 which controls the application of air to the supply pipes 50, of the two carriages 44. These three valves are supplied with moving means so mounted and interlocked as to prevent a bank of burners from being withdrawn from the ports without first shutting off the supply of oil thereto, to prevent the supply of oil being turned on at any time that the burners are not in proper firing position, and to prevent both banks from firing at the same time. (See Figs. 5, 6 and 7.) The valve 51 comprises a cylindrical chamber 73 having a rotary valve member 74 mounted therein. On the squared end of the shaft of the member 74 are mounted a handle 75 and a locking member 76, the member 76 having legs 76a and 76b set approximately at right angles to each other and carrying locking pins 77a and 77b.

The valves 70a and 70b, controlling the air motors 60a and 60b on either side of the furnace, are generally similar to the valve 51, and are respectively provided with combined handles and locking members 78a and 78b. Each of these members has a pair of locking notches 79a, 79b and 80a, 80b adapted to engage the locking pins 77a and 77b of the valve 51. Suitable stops 86a and 86b are provided, as shown in Fig. 6, to prevent movement of the member 78a clockwise beyond the position shown in Fig. 6, and to prevent the movement of the member 78b counterclockwise beyond the corresponding position.

As seen in Fig. 6, the control mechanism is shown in the position in which the burners of Fig. 6 are in the firing position, while the burners on the opposite side (Fig. 5) are in withdrawn or inactive position. In this position, the valve 51 opens communication between the air supply pipe 81 and the pipe 82a which connects through flexible connections with the pipe line 50 of the burner bank of Fig. 6. When in this position, the valve 51 also opens communication between the line 82b leading from the line 50 of the burner bank of Fig. 5, and the exhaust pipe 83. In the position shown, the valve 70a controlling the motor 60a (Fig. 6) is turned to open communication between the air supply pipe 71a through the pipe 69 to the lower end of the piston, to move the rack 61 upwardly to swing the carriage 44 and with it the burners into the firing position, as shown in Fig. 6. In this position, the locking pin 77b engages the notch 80a of the member 78a.

The valve 70b which controls the movement of the bank or burner illustrated in Fig. 5, is in a position opposite to that of the valve 70a, and in this case, the air has been exhausted from the bottom of the cylinder 60b, and has been applied above that piston, moving the rack downwardly and withdrawing the carriage 44 and with it the burners controlled thereby.

Starting from the position shown in Fig. 6, when it is desired to reverse the furnace, the operator moves handle 75 counterclockwise to the vertical position, which brings the valve 51 to neutral position, blanketing the supply pipe 81. When this is done, he reverses the condition of the controlling dampers or gates, which connect the flues 31 alternately with the air intake and the stack. He may then move the member 78b counterclockwise to reverse the condition of the valve 70b, thus supplying air pressure to the lower portion of the piston 60b (Fig. 5) and operating the rack and pinion to move its bank of burners into firing position. He may at the same time move the members 78a counterclockwise to reverse the condition of the valve 70a, controlling the movement of the burner bank, of Fig. 6, exhausting air from the lower end of the cylinder 60a and supplying air to the upper end thereof, and thus operating the rack 61 to withdraw the burners of that bank from firing position. At this point in the operation, with the burners of Fig. 5 in firing position and the burners of Fig. 6 out of firing position, the operator then moves the handle 75 counterclockwise to connect the air supply pipe 81 with the line 50 of Fig. 5. This furnishes the oil and atomizing air supply to the burners of the bank of Fig. 5. These burners are ignited by the incandescent walls of the furnace. From this description, it is seen that the arrangement is such that it is impossible to maintain both burners in the firing position and receiving a supply of fuel at the same time.

Automatic means are provided for closing the burner ports when the burners are in withdrawn position (see Figs. 10 and 12), comprising for each port a member 90 pivoted in a frame 91 immediately above the port, and having an extension 92 adapted to coact with a bell-crank lever 93 pivoted at 94 on an ear 95 formed on the bracket 38. Each burner slide 36 carries a cam member 96 which coacts with a cam surface 97 on one end of the bell-crank lever 93 as the burner is moved into firing position, to move the opposite end of the lever outwardly from the bracket 38. This lever contacting with the projection 93, swings the closure member 90 away from the port 24. As the burner is withdrawn and the cam member 96 moves out of contact with the surface 97, the closure member 90 is free to swing back into closing position, stopping in such position when the projecting member 92 contacts with the side of the bracket 38.

The details of the burner are best illustrated in Figs. 9, 10 and 11. The burner may comprise a nozzle 98 having a central bore 99 connecting with a tail member 100 to which oil is supplied through pipe 55. Surrounding the nozzle 98 is a spaced jacket 102 which provides an annular space 103 for the atomizing air which is admitted thereto by pipe 58.

The invention includes special arrangements by which the clogging of the oil nozzle is prevented. Mounted in the bore 99 is a fluted rod 101 having a reduced end portion 105. The opposite end of the rod extends outwardly beyond the tail piece 100 and terminates in a head 106. Between the head 106 and the end of the tail piece is provided a compression spring 107 which normally urges the rod 105 away from the burner nozzle, the extent of such movement being limited by a nut 107a. When the burner carriage 36 is moved away from the furnace, the head 106 contacts with an adjustable screw 108 mounted in a bracket 109 secured to the bracket 38. This contact compresses the spring 107 and forces the reduced end 105 into and through the tip of the oil nozzle to remove carbon or other sediment which may have accumulated during the firing period.

In the operation of the furnace embodying the described invention, a suitable amount of glass being already in the furnace and batch being continuously fed thereto, the several sections of the recuperators being suitably opened to give the desired draft and air conditions, and the individual burner mechanisms being adjusted to supply to their burners the required amount of fuel to secure the proper heat gradient throughout the furnace, the control mechanism described may be set as shown in Fig. 6, moving the burners of Fig. 6 into the firing position as described and supplying fuel to all the burners, while the burners on the opposite side of the furnace as shown in Fig. 5 are withdrawn in the inactive position, and the supply of fuel thereto cut off. At regular periods, the furnace is reversed by the operation of the control valve, as above described.

As the burners of either bank are withdrawn on this reversal, the closure plates 90 on that side of the furnace close the openings 24 and when the burners are again moved in, these closure plates are cammed out as above described. The burners are cleaned on the withdrawal.

While the invention has been described as applied to the particular type of furnace illustrated, the invention is not to be limited to such application, nor is it to be limited to the particular structure or arrangement shown, as obviously various rearrangements and substitution of parts may be made within the spirit and scope of the invention.

I claim:

1. In a regenerative furnace, opposing series of ports, burners for the ports of each series mounted for movement toward and away from the ports, motor means for moving the burners of each series toward and away from the ports, means for controlling the supply of fuel to the burners, means for controlling the application of motive power to the motor means, and means for interlocking the controlling means to prevent simultaneous firing of burners of different series.

2. In a regenerative furnace, opposing series of ports, burners for the ports of each series mounted for movement toward and away from the ports, motor means for moving the burners of each series toward and away from the ports, means for controlling the supply of fuel to the burners, means for controlling the application of motive power to the motor means, and means for interlocking of the controlling means to prevent firing of burners of either series when out of firing position at the ports.

3. In a regenerative furnace, opposing series of ports, burners for the ports of each series mounted for movement toward and away from the ports, pneumatic means for moving the burners of each series into and out of position toward and away from the ports, a valve for controlling the supply of fuel to the burners of each series, a valve for controlling the application of pneumatic pressure to the pneumatic moving means, manual means for shifting the valves, and interlocking means for said manual means to prevent the simultaneous application of fuel to burners of different series and the firing of the burners of either series when out of firing position at the ports.

4. In a regenerative furnace, opposing series of burner ports, series of burners therefor, means for moving each series of burners as a unit toward and from its ports, means for simultaneously controlling the supply of fuel to all of the burners of a series, and means individual to each burner of a series for regulating the character of the fuel supply.

5. In a regenerative furnace, opposing series of burner ports, series of burners therefor, means for moving each series of burners as a unit toward and from its ports, means for simultaneously controlling the supply of fuel to all of the burners of a series, means individual to each burner of a series for regulating the character of the fuel supply, regenerators, and means for regulating the extent of effectiveness of separate portions of the regenerators whereby a curtain of flame providing a predetermined desired heat gradient in the furnace may be periodically applied by each series of burners through the operation of the moving means and the means for simultaneously controlling the fuel supply.

6. In a regenerative furnace, opposing series of burner ports, series of burners therefor, unitary means for simultaneously moving all of the burners of a series into and out of position in said ports, said means including motor means for applying movement to the whole series and individually adjustable resilient driving means for each burner providing a yielding connection to prevent injury to the burners and ports upon movement of the burners into position.

7. In a regenerative furnace, a burner port, a burner mounted for movement toward and from the port, a fuel passage therein, automatic means for moving the burner into and out of the port, and means effective in response to the automatic movement of the burner away from the port for cleaning the fuel passage in the burner.

8. In a regenerative furnace, a burner adapted for movement into and out of a burner port, automatic means for moving the burner, an oil passage in the burner having an opening adjacent the burner tip, a cleaning rod located in said passage, a spring adapted to maintain the rod in the rearward portion of said passage and away from the opening, and means responsive to the movement of the burner away from the port for projecting said rod forwardly to clean the opening.

VERGIL MULHOLLAND.